A. J. DREMEL.
ROTARY CULTIVATOR.
APPLICATION FILED FEB. 19, 1912.

1,041,980.

Patented Oct. 22, 1912.

7 SHEETS—SHEET 1.

Witnesses:
C. C. Palmer.
F. W. Hofmeister.

Inventor.
Albert J. Dremel
By E. W. Burgess
Attorney.

A. J. DREMEL.
ROTARY CULTIVATOR.
APPLICATION FILED FEB. 19, 1912.

1,041,980.

Patented Oct. 22, 1912.
7 SHEETS—SHEET 2.

Witnesses:
C. C. Palmer
F. W. Hoffmeister

Inventor:
Albert J. Dremel
By E. W. Burgess
Attorney

A. J. DREMEL.
ROTARY CULTIVATOR.
APPLICATION FILED FEB. 19, 1912.

1,041,980.

Patented Oct. 22, 1912.
7 SHEETS—SHEET 3.

Witnesses:
C. C. Palmer.
F. W. Hoffmeister.

Inventor.
Albert J. Dremel.
By E. W. Burgess
Attorney

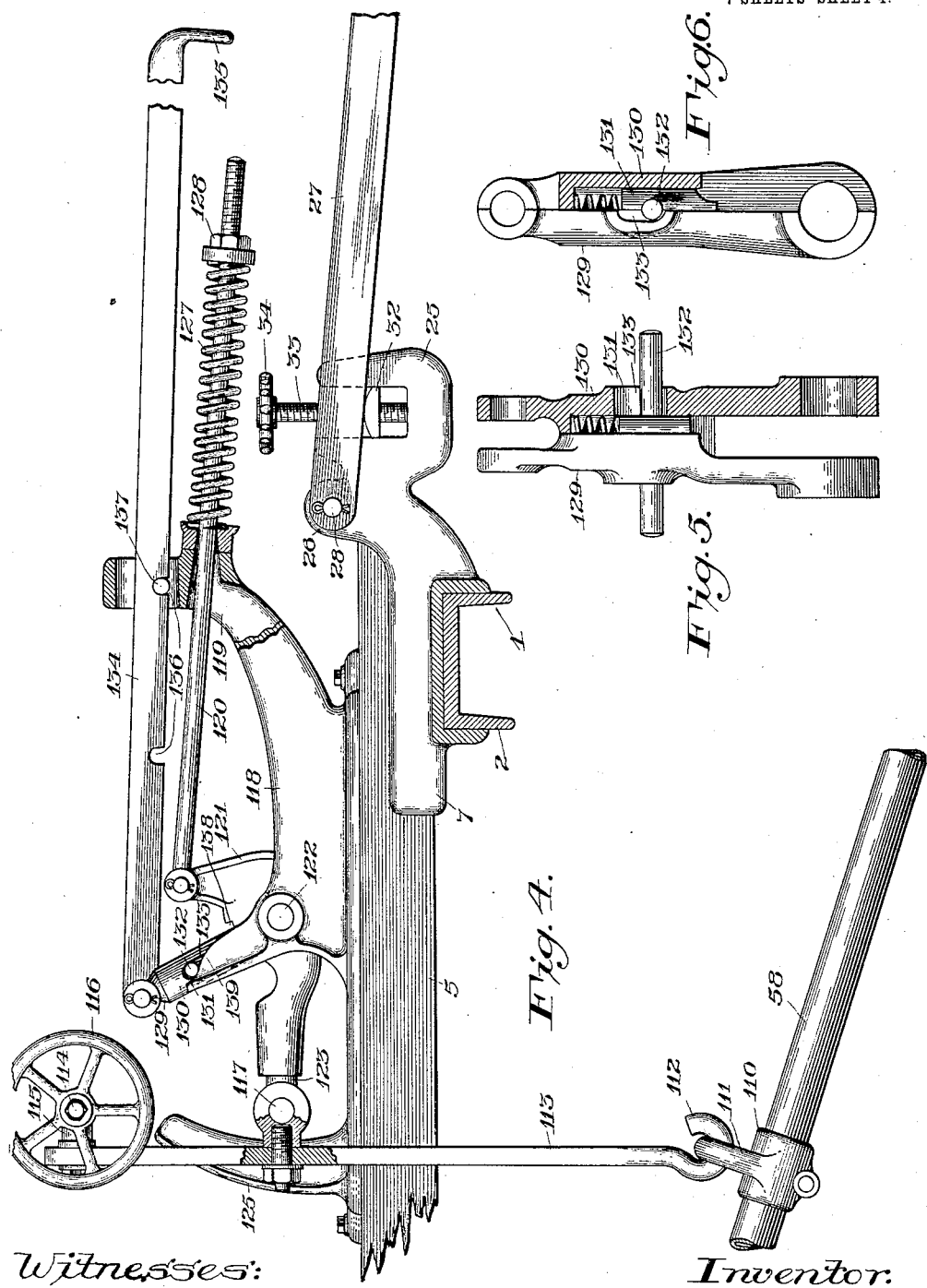

A. J. DREMEL.
ROTARY CULTIVATOR.
APPLICATION FILED FEB. 19, 1912.
1,041,980.
Patented Oct. 22, 1912.
7 SHEETS—SHEET 5.
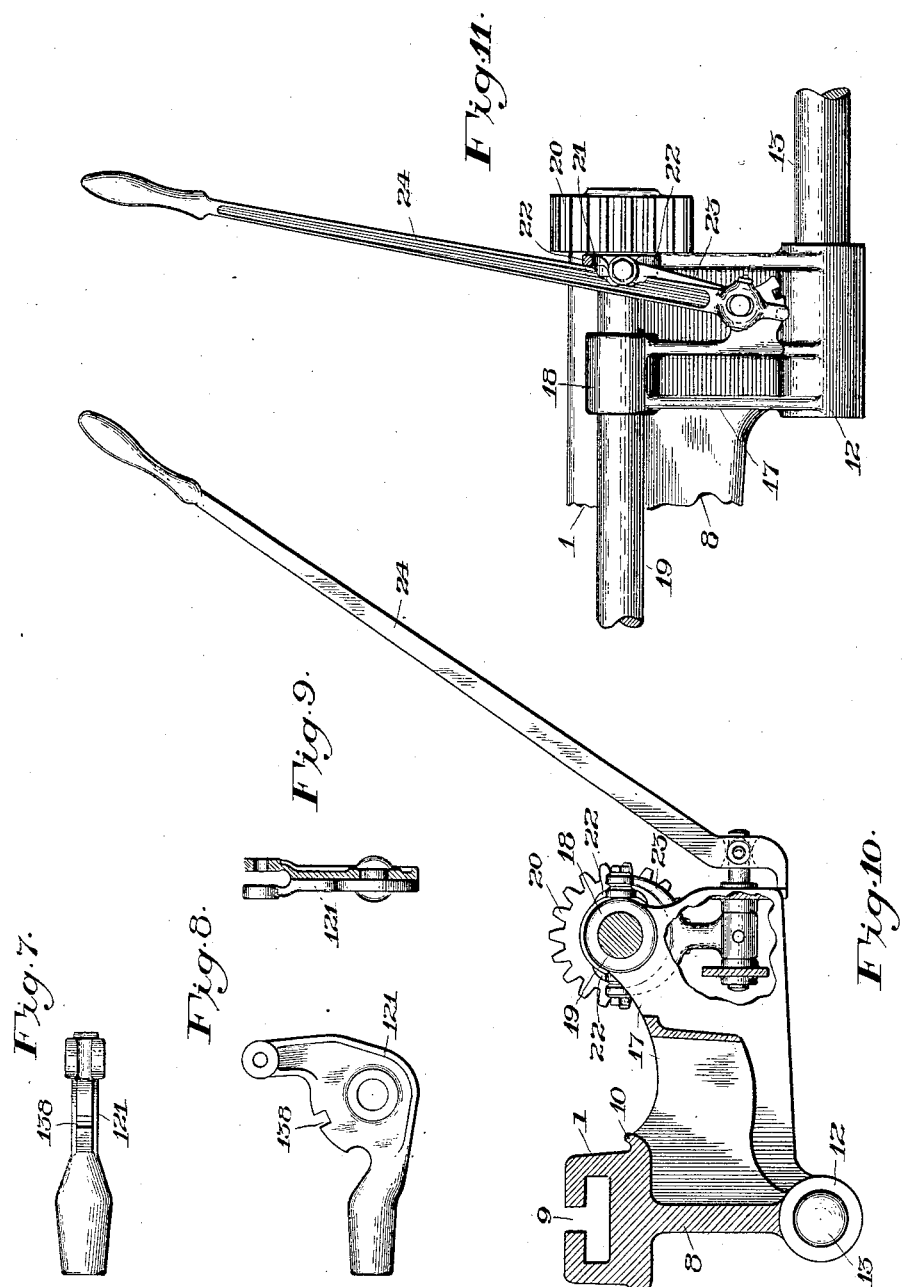
Witnesses:
C. C. Palmer.
F. W. Hoffmeister.
Inventor:
Albert J. Dremel.
By E. W. Burgess
Attorney.

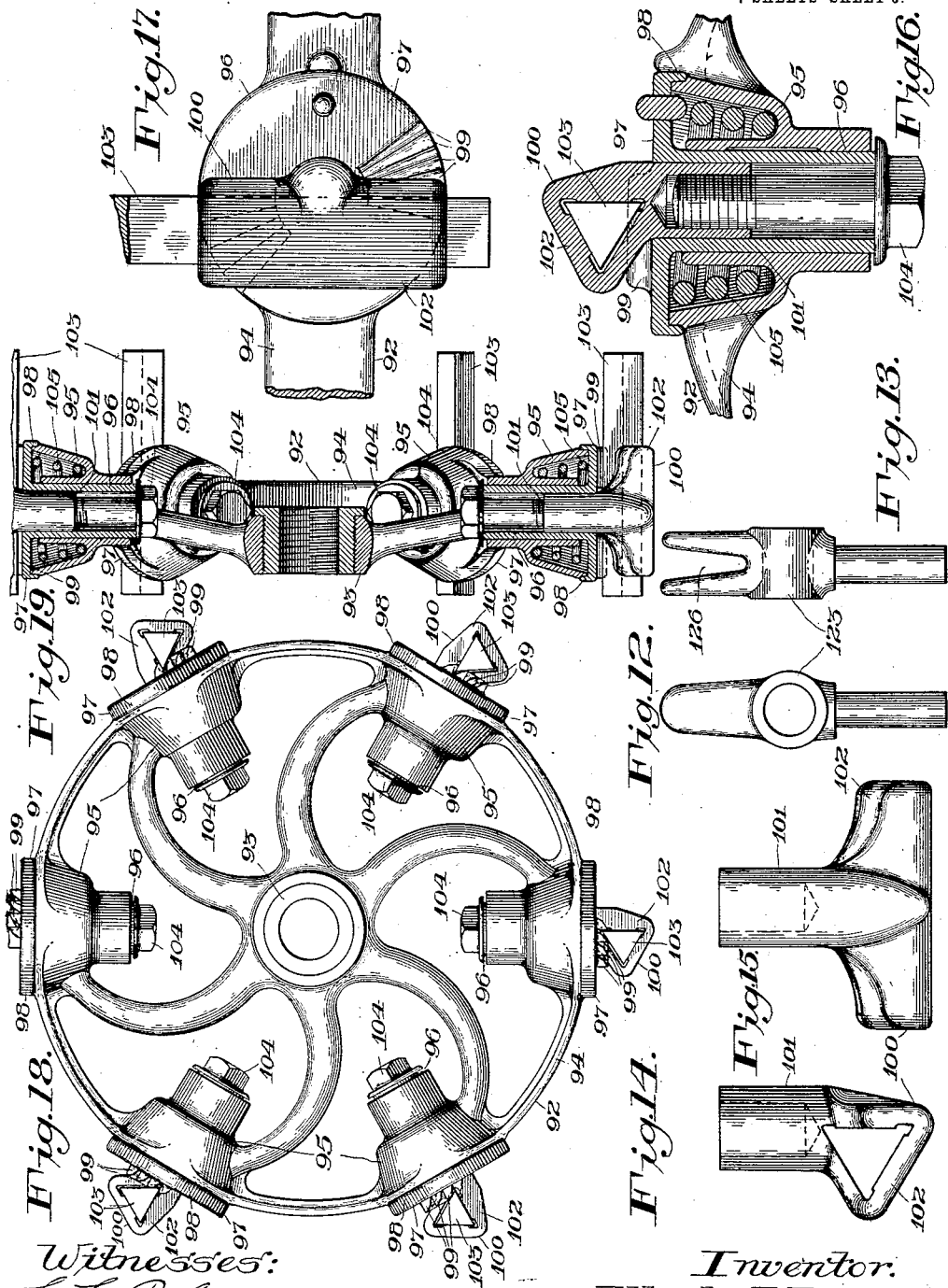
A. J. DREMEL.
ROTARY CULTIVATOR.
APPLICATION FILED FEB. 19, 1912.
1,041,980.
Patented Oct. 22, 1912.
7 SHEETS—SHEET 6.
Witnesses:
C. C. Palmer.
F. W. Hoffmeister.
Inventor:
Albert J. Dremel.
By C. W. Burgess
Attorney

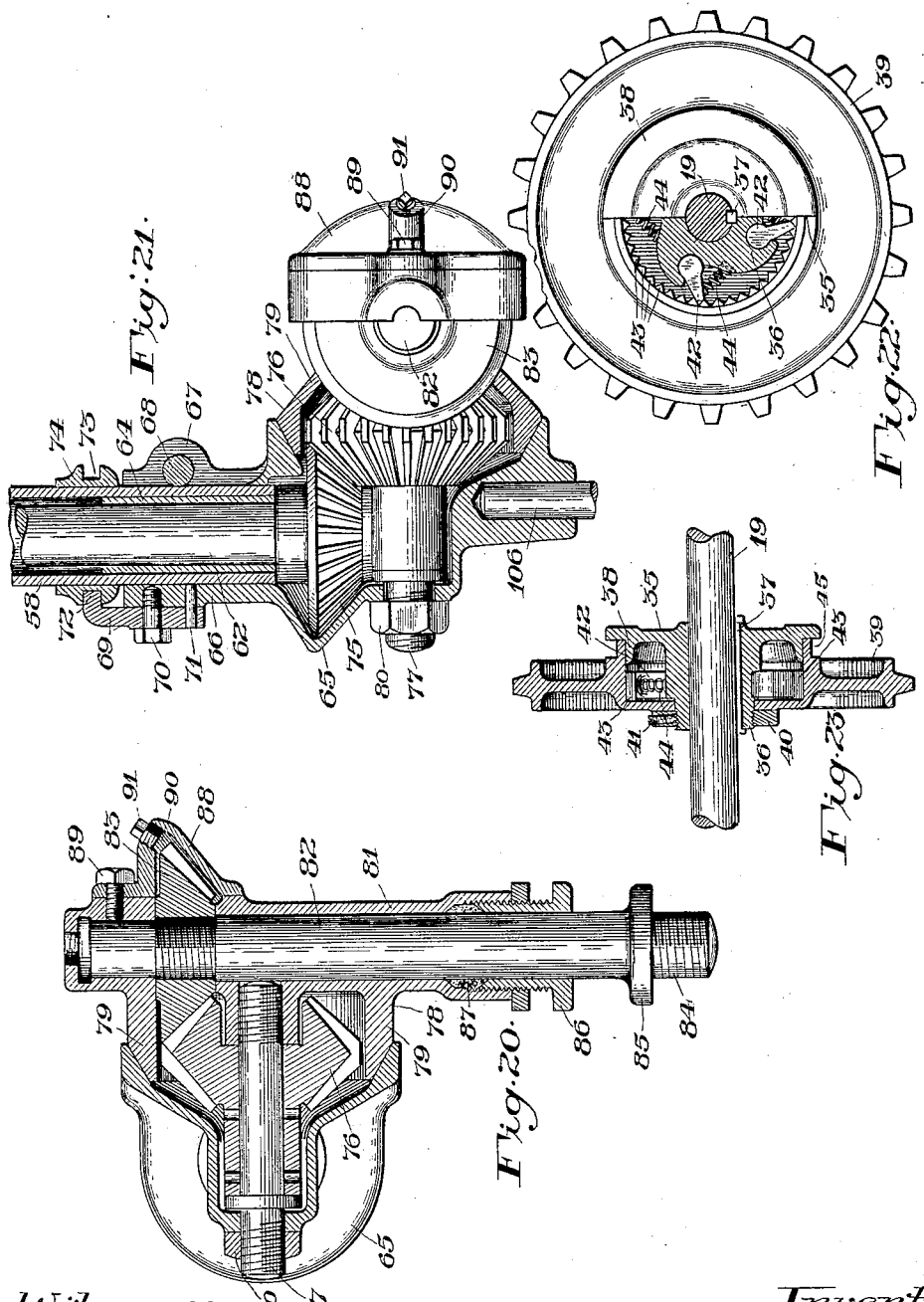

UNITED STATES PATENT OFFICE.

ALBERT J. DREMEL, OF RACINE, WISCONSIN.

ROTARY CULTIVATOR.

1,041,980.　　　　　　Specification of Letters Patent.　　Patented Oct. 22, 1912.

Application filed February 19, 1912. Serial No. 678,628.

*To all whom it may concern:*

Be it known that I, ALBERT J. DREMEL, a subject of Francis Joseph, Emperor of Austria-Hungary, residing at Racine, in the county of Racine and State of Wisconsin, have invented certain new and useful Improvements in Rotary Cultivators, of which the following is a specification.

My invention relates to tillage implements in its general adaptation, and is applicable in particular to that type having rotary cultivating elements driven by means of power transmitted from the traction wheels and wherein the axis of rotation thereof is substantially vertical.

It consists in an improved construction of the rotatable cultivating elements; in a novel manner of transmitting motion thereto; to means whereby the axis of rotation thereof may be inclined laterally relative to the vertical, or in a fore and aft direction relative to the line of draft of the machine; to improved means for counterbalancing the weight of the cultivating elements; in improved means for raising and lowering such elements, and in the manner of mounting the driving mechanism whereby the machine as a whole is balanced over the axis of the traction wheels, the object of my invention being to provide a soil cultivating implement that will thoroughly break up and disintegrate the soil and one that may be manipulated in a manner to throw the soil toward or from a given line in an aggressive or non-aggressive manner. I attain these objects by means of the mechanism illustrated by the accompanying drawings, in which—

Figure 1:
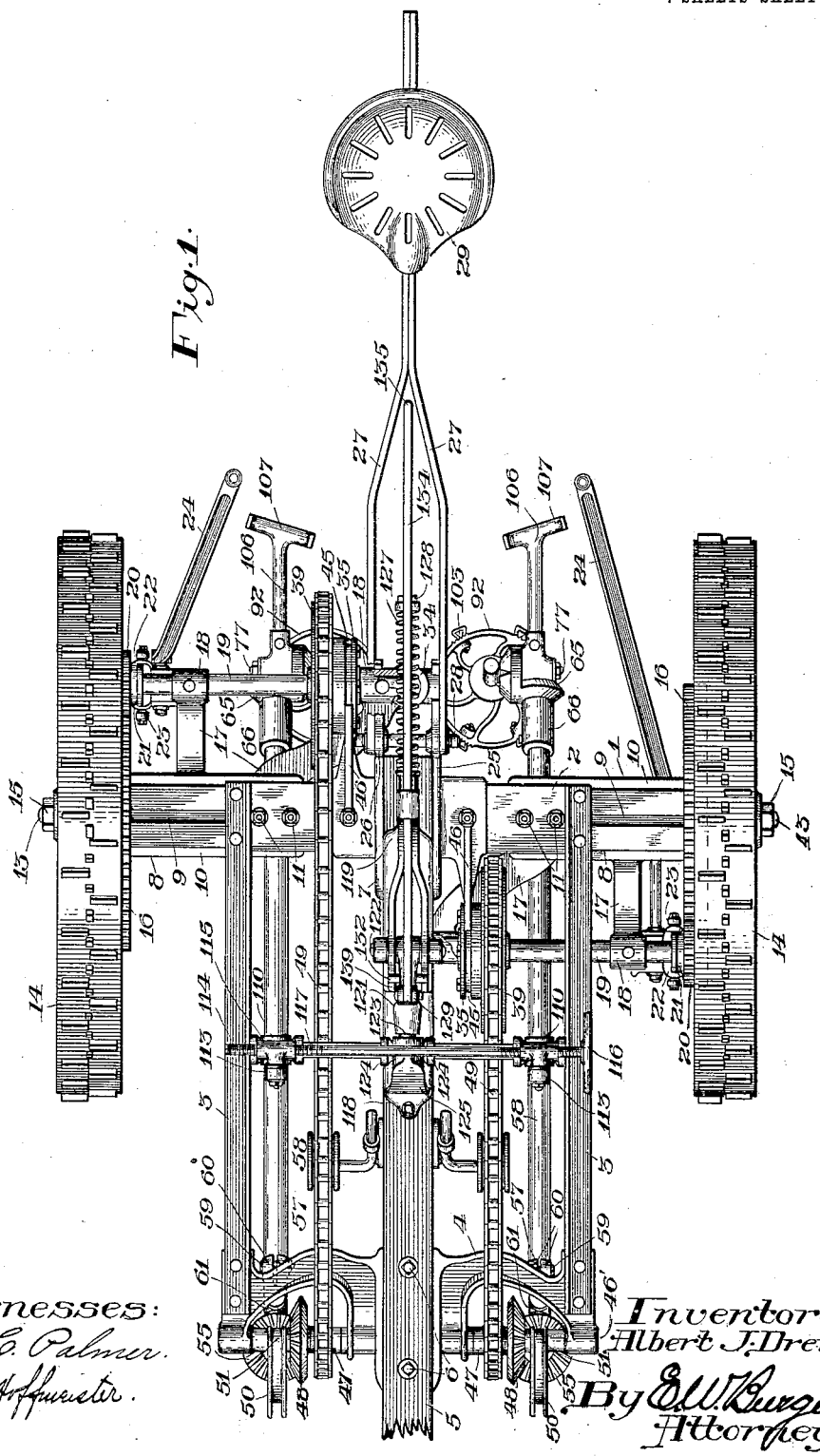
Figure 2:
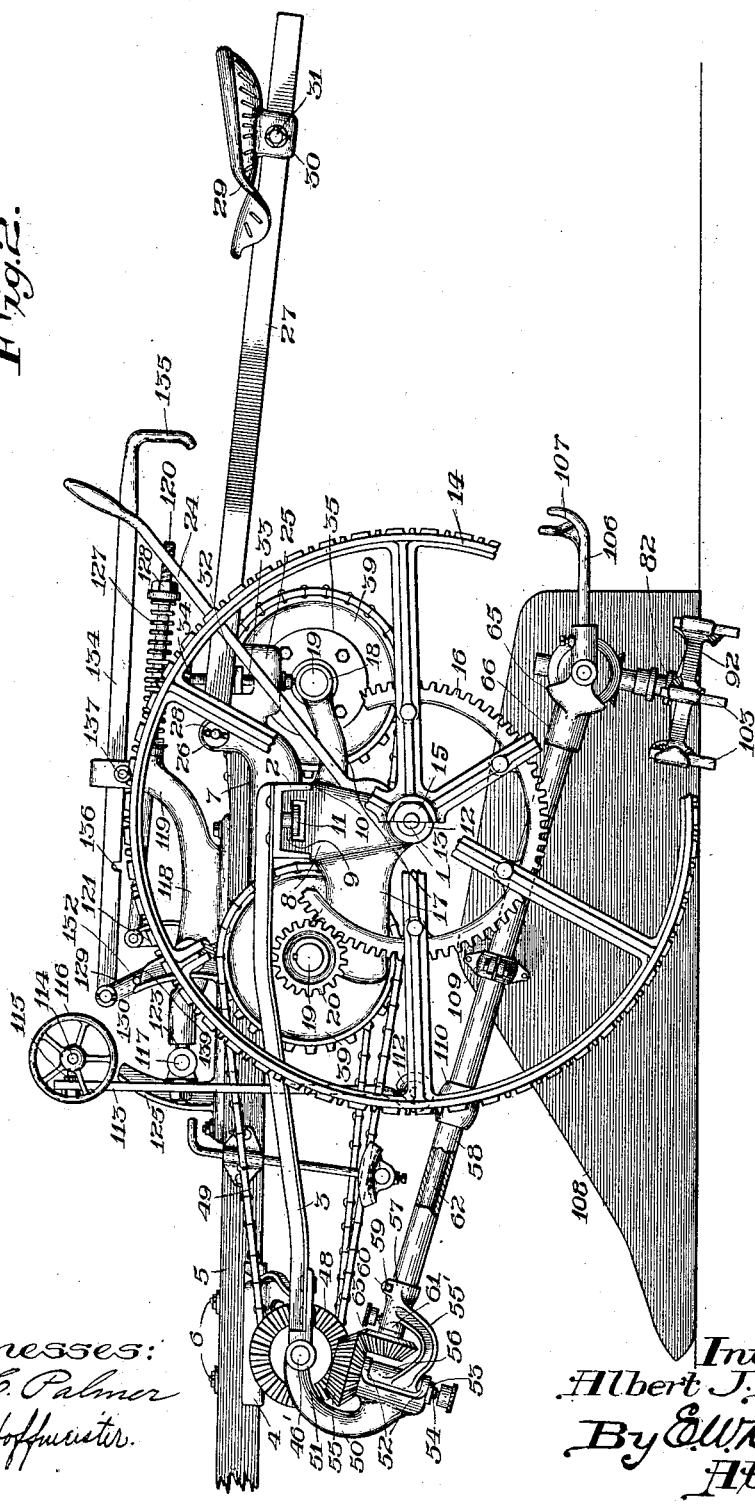
Figure 3:
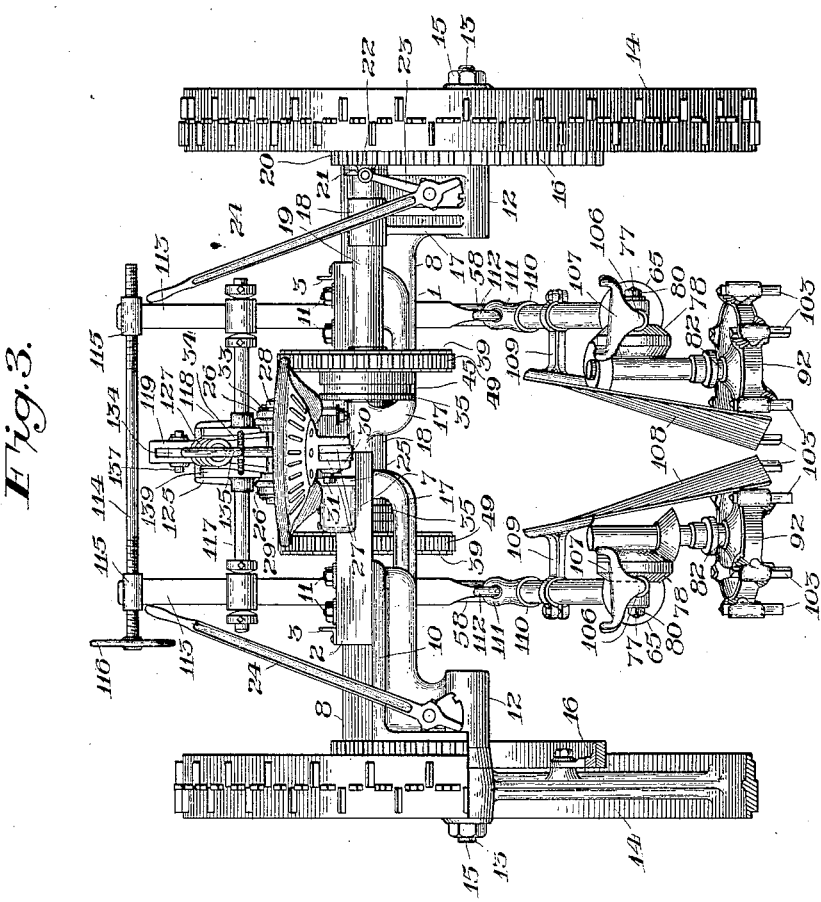

Figure 1 represents a top plan view of a straddle row cultivator having my invention embodied in its construction; Fig. 2 is a side elevation of Fig. 1 with the traction wheel upon that side of the machine and part of the driving gear broken away for the purpose of a better illustration of the operative parts of the mechanism; Fig. 3 is a rear elevation of Fig. 1; Fig. 4 is a detached detail of Fig. 1, partly in section, and designed to illustrate, on an enlarged scale, the construction of the raising and lowering and spring counterbalancing mechanism connected with the cultivating elements; Fig. 5 is a detached detail of one of the parts in rear elevation, and partly in section, shown in Fig. 4; Fig. 6 is a side elevation of Fig. 5, partly in section; Fig. 7 is a detached detail of one of the parts of Fig. 4; Fig. 8 is a side elevation of Fig. 7; Fig. 9 is an end elevation of Fig. 8; Fig. 10 is a detached detail of part of Fig. 1, partly in section, and designed to illustrate a part of the gear shipping mechanism; Fig. 11 is a side elevation of Fig. 10; Fig. 12 represents a detail part of the raising and lowering and counterbalancing mechanism as shown in Fig. 4; Fig. 13 is a side elevation of Fig. 12; Fig. 14 is a detached detail of one of the tooth holders forming part of the cultivating elements; Fig. 15 is a side elevation of Fig. 14; Fig. 16 is a detached detail in section and designed to illustrate the yielding manner in which the teeth are connected with the rotatable heads of the cultivating mechanism; Fig. 17 is a side elevation of Fig. 16 as it would appear without being section lined; Fig. 18 is a top plan view of one of the tooth carrying heads; Fig. 19 represents a side elevation of a half section of Fig. 18; Fig. 20 is a vertical section of part of the gear mechanism connected with the rotatable cultivating heads; Fig. 21 is a top plan view, partly in section, of Fig. 20; Fig. 22 is a side elevation, with parts shown in section, of one of the main driving sprocket wheels; and Fig. 23 is a vertical section of Fig. 22.

The same reference characters designate like parts throughout the several views.

1 represents a wheel frame including a transversely arranged channel bar 2, longitudinally arranged side frame members 3 having the rear ends thereof secured to opposite ends of the bar 2, and the front ends thereof to opposite ends of a bracket member 4, the middle portion of the bracket being secured to a draft tongue 5, by means of bolts 6, and 7 represents a base member secured to the middle portion of the bar 2, and having the rear end of the draft tongue secured thereto.

8 represents depending hangers provided with longitudinally arranged slots 9, and rib portions 10; the channel bar 2 being received between the rib portion, and the hangers slidably secured thereto by means of bolts 11 received by the slots therein. The hangers are provided with barrel portions 12 at the lower ends thereof, in which are secured laterally projecting stub axle members 13, upon which are journaled traction wheels 14, that are secured thereon by means of nuts 15, and 16 represents spur gear members secured to the spokes of said wheels concentric with the axis thereof. The hangers are provided with arms 17 that extend in a fore and aft direction relative to the advance of the machine; those upon the left-hand side of the machine extending in front of the axis of the traction wheels, and those upon the right-hand side thereof in rear of the axis of said wheels. The ends of the arms are provided with bearing sleeves 18, in which are journaled transverse shafts 19 in a manner permitting said shafts to move longitudinally therethrough, and 20 represents pinions secured to the outside ends of each shaft and adapted to engage with the spur gear members 16; the hub of the pinions being provided with circumferential grooves 21 that receive the arms 22 of a shipping mechanism 23 pivotally mounted upon the hanger 8 and controlled by means of hand levers 24 connected therewith and extending rearward and upward within convenient reach of the operator.

25 represents an arm integral with the base member 7 and extending rearward therefrom which is provided with vertically arranged ear members 26 spaced apart in a manner to receive the rear ends of seat supporting bars 27 that are spread apart and secured to the ear members by means of a pivot pin 28, the bars being joined together at the rear ends thereof in parallel relation in a manner to support a seat 29 that is provided with depending ear members 30 that receive the bars between them in a slidable manner; the seat being secured in any desired position of adjustment by means of a set screw 31 threaded through one of the ear members 30.

32 represents a transversely arranged clip member, the opposite ends thereof engaging with the lower edges of the bars 27 in rear of the pivotal connection thereof with the arm 25, and 33 represents a threaded rod received by the middle portion of the clip and having the lower end thereof engaging with the arm 25, and provided at its upper end with a hand wheel 34, whereby the mechanism may be manipulated in a manner to raise or lower the rear ends of the seat supporting bars as desired.

35 represents pawl carrying plates having hub portions 36 that are slidably mounted upon the transverse shafts 19 and caused to rotate therewith by means of keys 37 that engage keyways in the shaft in a well-known way. The plates are provided with laterally projecting rim portions 38 that form bearings upon which are journaled sprocket wheels 39; the wheels having a supplemental bearing upon the hubs 36, and held against lateral movement by means of the plate members and collars 40 threaded upon the ends of the hub members and secured by means of set screws 41.

42 represents pawl members carried by the plates and adapted to engage with teeth 43 upon the sprocket members in a manner to transmit motion thereto when the pawl plates are rotated in one direction, and permit independent rotation of said plates in an opposite direction; the pawl being yieldingly held in engagement with the teeth of the sprocket members by means of compression springs 44.

45 represents a circumferential channel, one side wall thereof being a shoulder portion upon the sprocket member and the opposite side wall the pawl plate, and 46 represents fork members having one end thereof received by said channel and the opposite ends thereof secured to the base member 7, whereby the sprocket members are secured against lateral movement when the shafts 19 are moved longitudinally.

$46^1$ represents a transversely arranged shaft carried by the bracket member 4, and upon which are journaled combined sprocket wheels 47 and beveled gear wheels 48, upon opposite sides of the draft tongue, and 49 represents sprocket chains connecting the sprocket wheels 39 with the sprocket wheels 47.

50 represents depending hangers having sleeve portions 51 at the upper ends thereof whereby the hangers are mounted upon the shafts $46^1$ in a manner to swing in a fore and aft direction thereon and provided with ear members 52 arranged in a vertical plane and adapted to receive opposite ends of thimbles 53, in which are journaled short shafts 54 having double faced pinions 55 secured thereto that engage with the gear wheels 48.

$55^1$ represents rearwardly projecting arms having sleeve members 56 that are pivoted upon the thimble members 53 and provided with rearwardly extending socket members 57 that are split longitudinally at the rear ends thereof and adapted to receive the front ends of tubular drag bars 58, that are secured therein by means of bolts 59 passing through ear members 60 upon opposite sides of the splits in the sockets, the bodies of the bolts being received by transverse grooves across the bars in a manner preventing any axial movement of the bars relative to the sockets, the mechanism permitting a rising and falling movement of the rear ends of the bars and also a swinging movement thereof laterally. The socket members are provided with bearing thimbles 61 in front of the split portions thereof, in which are journaled the front ends of shafts 62, and 63 represents pinions secured to the shafts and engaging with the double faced pinions 55 secured to the short shafts 54. The rear ends of the shafts 62 are journaled in bearing thimbles 64 received by the rear ends of the drag bars, and 65 represents gear cases having forwardly extending socket members 66 that receive the rear ends of the tubular drag bars; the wall of the sockets being split longitudinally along one side thereof and provided with laterally projecting ear members 67 upon opposite sides of the split therein that receive clamping bolts 68 in a manner permitting the gear cases to be turned axially upon the drag bars in any desired position of adjustment, and securely held in such position by means of the clamping bolts.

69 represents clip members secured to the front ends of the sockets by means of bolts 70 and pins 71, and extending beyond the sockets are provided with inturned ends 72 that are received by circumferential grooves 73 in collars 74 that are secured upon the drag bars; the clips holding the gear cases against endwise movement upon the drag bars. Pinions 75 are secured to the rear ends of shafts 62 and engage with double faced pinions 76 that are journaled upon studs 77 secured to supplemental gear cases 78, the latter being provided with laterally projecting circular rim portions 79 concentric with the axis of the studs 77 and having inwardly and outwardly inclined bearing surfaces that are adapted to engage with complemental surfaces upon the gear cases 65 in a manner permitting the supplemental cases to be turned about the axis of the studs 77, the supplemental gear cases being adjustably secured to the cases 65 by means of nuts 80 at the outside end of the studs 77. The supplemental cases are further provided with vertically arranged tubular portions 81, in which are journaled shafts 82 having secured to the upper ends thereof pinions 83 that engage with the double faced pinions 76 journaled upon the studs 77, and provided with lower threaded shank portions 84 that terminate in collars 85, and 86 represents glands threaded into the lower ends of the tubular portions and coöperating with an enlargement thereof to form stuffing boxes 87 to exclude dust and prevent a leakage of lubricant. The supplemental cases are also provided at the upper ends thereof with lateral openings to permit the insertion of the pinions 83, the openings being closed by means of plates 88 secured to the walls of the cases by means of cap screws 89, and 90 represents a duct through the upper part of the plates closed by a removable plug 91 whereby lubricant may be supplied to the operative parts of the mechanism.

92 represents circular tooth carrying heads, or wheels, having the hub portions 93 thereof threaded in a manner to receive the lower threaded shank portions of the shafts 82 and provided with rims 94 that carry a series of radially arranged sockets 95 that receive thimbles 96 that are provided with circular flanged heads 97 having inwardly extending annular rib portions 98 upon the inner surfaces thereof and radially arranged teeth 99 upon the outside surfaces thereof.

100 represents tooth holding members having tubular shank portions 101 that are received by the thimbles 96, and head portions 102 that are provided with angular vertical tooth receiving openings in which are inserted cultivating teeth 103; the tubular shank portions of the tooth carrying members being secured in the sockets by means of cap screws 104 in a manner whereby they may be adjusted at varying angles relative to the heads upon which they are mounted, and controlled by the radially arranged teeth upon the flanged heads of the thimbles. The sockets 95 are provided with surrounding annular chambers at their outside ends that receive coiled springs 105 having one end thereof connected with the heads and the opposite ends thereof with the thimbles whereby the cultivating teeth are yieldingly held in operative relation with the heads and may turn about the axes of the thimbles when meeting an unyielding obstruction.

106 represents foot levers carried by the gear cases 65 and extending rearward are provided with stirrup members 107 within convenient reach of the operator, whereby the movement of the drag bars and cultivating elements may be controlled. Plant shields 108 are secured to the drag bars by means of clips 109. A rising and falling and a lateral swinging movement of the drag bars is controlled by means including sleeve members 110 secured thereto and having eye portions 111, to which are connected the hook portions 112 of vertically arranged bars 113 that extend upward above the frame of the machine and have the upper ends thereof connected by means of a transversely arranged shaft 114, that is provided with right and left threaded portions at opposite ends thereof that engage with eye members 115 pivotally connected with the bars; the shaft being provided with a hand wheel 116 at one end thereof whereby said shaft may be manipulated in a manner to move the upper ends of bars 113 in opposite directions toward and from each other, and 117 represents a transversely arranged bar having opposite ends thereof pivotally connected with the bars 113, below the shaft 114, in a manner forming fulcra for said bars when the shaft 114 is manipulated.

118 represents a longitudinally arranged bracket member secured to the upper side of the draft tongue, having an upturned arm 119 at its rear end provided with an opening near the upper end thereof that slidably receives the body portion of a longitudinally arranged link 120, the forward end of the link being pivotally connected with one arm of a bell crank lever 121 that is pivotally mounted upon a cross pin 122 carried by the bracket member, the remaining arm of the bell crank lever being provided with a socket that receives a detent 123 provided with a transverse opening therein that receives the middle portion of the transverse bar 117, and 124 represents collars secured to the bar upon opposite sides of the detent.

125 represents a vertically arranged arm integral with the bracket member at the front end thereof and arranged concentric with the axis of the pin 122 and in front of the bar 117, the detent being provided with a longitudinally arranged gap 126 at its front end that receives the web of the arm 125 in a slidable manner.

127 represents a compression spring encircling the rear end of the link 120 and operative between the arm 119 and an adjusting nut 128 in a manner to counterbalance the weight of the drag bars through the bell crank lever 121.

129 represents a lever having a slotted lower end that receives the middle portion of the bell crank lever and having transverse openings in the side walls thereof that receive the cross pin 122. The slotted portion of the lever terminates in a socket 130 that extends toward the opposite end of the lever and receives a spring pressed sliding detent 131, and 132 represents a transverse pin received by slotted openings 133 in opposite walls of the socket and engaging with the detent. The upper end of the lever is pivotally connected with the front end of a bar 134, the body of the bar being slidably received by a slotted opening in the arm 119, and the rear end thereof provided with a downturned handle portion 135 within convenient reach of the operator, and 136 represents notches in the lower edge of the bar spaced apart in the direction of the length of the bar and adapted to engage with a cross pin 137 received by openings through opposite walls of the slotted opening in the arm in a manner to retain the bar in a selected position. The detent 131 is adapted to engage with a notch 138 in the middle portion of the bell crank lever 121, when the bar 134 is drawn rearward for the purpose of raising the drag bars, but when the drag bars are lowered, opposite ends of the cross pin 132 engage with upwardly and forwardly inclined wing members 139 integral with the bracket member 118 upon opposite sides of the lever 129, in a manner to disengage the detent from the notch and permit a free rocking movement of the bell crank lever as controlled by the counterbalancing spring.

What I claim as being my invention, and desire to secure by Letters Patent is:

1. A tillage implement having, in combination, a wheel frame, traction wheels having said frame mounted thereon, a rotatable tooth carrying head carried by said frame, power transmitting means connecting said head with said traction wheels, said head being rotatable about a vertical axis, and means for varying the axial angle thereof laterally and in a fore and aft direction relative to the draft line of the machine.

2. A tillage implement having, in combination, a wheel frame, traction wheels having said frame mounted thereon, a drag bar having the front end thereof pivotally connected with said frame in a manner permitting the rear end thereof to rise and fall in a vertical plane, a longitudinally arranged shaft journaled in bearings carried by said drag bar, the front end of said shaft being operatively connected with a traction wheel, a sectional gear case having one section thereof secured to the rear end of said drag bar in a manner permitting a turning movement thereof about the axis of said shaft and another section thereof secured to said first mentioned section in a manner permitting a turning movement thereof about a transverse axis, a vertically arranged shaft journaled in bearings carried by said second mentioned section, a toothed cultivating head secured to the lower end of said shaft, and gear members connecting the upper end thereof with the rear end of said longitudinally arranged shaft.

3. A tillage implement having, in combination, a wheel frame, traction wheels having said frame mounted thereon, a tubular drag bar having the front end thereof pivotally connected with said frame in a manner permitting the rear end thereof to rise and fall in a vertical plane, a shaft journaled within said drag bar, the front end of said shaft having driving gear connections with one of said traction wheels, a two-part gear case having one part thereof secured to the rear end of said drag bar in a manner permitting a turning movement thereof about the axis of said shaft and the other part thereof provided with a tubular portion having a shaft journaled therein, a laterally projecting stud having one end thereof secured to said tubular portion and the opposite end thereof to the other part of said gear case in a manner permitting a relative angular movement of said tubular portion in a fore and aft direction, a toothed cultivating head secured to the lower end of said gear case shaft, a pinion secured to the upper end of said shaft and engaging with a double faced pinion journaled upon said stud, said double faced pinion also engaging with a pinion secured to the rear end of the shaft journaled in said drag bar.

4. A tillage implement having, in combination, a wheel frame, hangers secured to said frame upon opposite sides thereof, stub axles carried by said hangers, traction wheels journaled upon said axles, gear wheels secured to said traction wheels, transversely arranged shafts journaled in bearings carried by said hangers and adapted to move longitudinally therethrough, pinions secured to said shafts and adapted to engage with said gear wheels, gear members slidably mounted upon the opposite ends of said shafts and connected with a fixed part of the structure in a manner preventing a lateral movement thereof during a longitudinal movement of said shafts, drag bars having the front ends thereof pivotally connected with the front of said wheel frame, rotatable cultivating elements carried by the rear ends of said drag bars, and operatively connected with said gear members.

5. A tillage implement having, in combination, a wheel frame, hangers secured to said frame upon opposite sides thereof, stub axles secured to said hangers, traction wheels journaled upon said axles, gear wheels secured to said traction wheels, arms carried by said hangers and disposed in a fore and aft direction, the arms upon one of said hangers extending in front of the axis of said traction wheels and those upon the other in rear thereof, transversely arranged shafts journaled in bearings carried by said arms, pinions secured to said shafts and adapted to engage with said gear wheels, gear members secured to the opposite ends of said shafts, manually controlled means for disengaging said pinions from said gear wheels, drag bars having the front ends thereof pivotally connected with the front of said wheel frame, rotatable cultivating elements carried by the rear ends of said drag bars and operatively connected with said gear members.

6. An implement of the class described having, in combination, a wheel frame, hangers secured to said wheel frame upon opposite sides thereof and adjustable transversely thereon, stub axles carried by said hangers, traction wheels journaled upon said axles, gear wheels secured to said traction wheels, transversely arranged shafts journaled in bearings carried by said hangers and adapted to move longitudinally therethrough, pinions secured to said shafts and adapted to engage with said gear wheels, hand levers mounted upon said hangers and connected with said shafts whereby the latter may be moved in opposite directions in a manner to cause said pinions to engage with or be disengaged from said gear wheels, drag bars having the front ends thereof pivotally connected with the front of said wheel frame, rotatable cultivating elements carried by the rear ends of said drag bars, and independently driven by means of gear connections with said shafts.

7. A tillage implement having, in combination, a wheel frame, traction wheels having said frame mounted thereon, drag bars having the front ends thereof pivotally secured to said frame in a manner permitting a rising and falling and a lateral swinging movement of the rear ends thereof, rotatable cultivating heads carried by the rear ends of said drag bars, the axes of rotation thereof being in a vertical direction, means whereby the angle of the axes thereof may be varied in fore and aft and lateral directions relative to the line of draft, and power transmitting means operative between said traction wheels and said cultivating heads.

ALBERT J. DREMEL.

Witnesses:
C. C. GITTINGS,
MATTIE E. PALMER.

---

Copies of this patent may be obtained for five cents each, by addressing the "Commissioner of Patents, Washington, D. C."